July 11, 1933.  N. F. HADLEY  1,918,034

HYDRAULIC SHOCK ABSORBER

Filed May 31, 1930

INVENTOR
NEWTON F. HADLEY.
BY
ATTORNEY

Patented July 11, 1933

1,918,034

UNITED STATES PATENT OFFICE

NEWTON F. HADLEY, OF BEVERLY HILLS, MICHIGAN, ASSIGNOR TO CHRYSLER CORPORATION, OF DETROIT, MICHIGAN, A CORPORATION OF DELAWARE

HYDRAULIC SHOCK ABSORBER

Application filed May 31, 1930. Serial No. 458,723.

This invention relates to improved shock absorbers for vehicles.

The main objects of this invention are to provide an improved shock absorber of the hydraulic type which is adapted to resist rebounding of the sprung part of the vehicle relative to the unsprung portion thereof with substantial rigidity and to allow the springs of the vehicle to more sensitively resist and cushion relative movement of the sprung and unsprung parts towards each other; to provide an improved and compact arrangement of the mechanism of a device of this kind so as to allow the same to be enclosed within a housing which may be received in the channel of a side member of a vehicle chassis; to provide an internal integrally formed cylinder in a housing of this kind for supporting a horizontally reciprocating piston; to provide an inertia member for regulating the fluid outlet of the cylinder so as to govern the movement of the piston in one direction which is shiftable in the paths substantially normal to the axis of the piston; and to provide a hydraulic shock absorber of simple and inexpensive construction.

An illustrative embodiment of this invention is shown in the accompanying drawing, in which.

Figure 4:
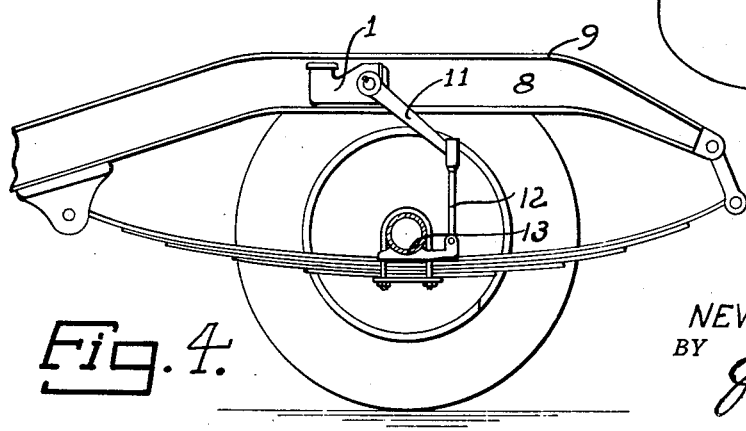
Fig. 4 is a fragmentary side elevation of a vehicle chassis showing the manner in which the shock absorber is mounted on the chassis.

In the form shown, the shock absorber includes a cast metal housing 1 having an end opening 2 and a top opening 3 which are provided with covers 4 and 5 respectively. Formed in the housing 1 is a horizontal cylinder 6 having an open end in registration with the end opening 2 of the housing and an outlet opening 7 in registration with the top opening 3 thereof. The housing 1, as shown in Fig. 4, is adapted to be mounted in a channel 8 of a side member 9 of a vehicle chassis.

Journaled in the housing 1 is a crank 10 having an external arm 11 located on the inner side of the side member 9 which is pivotally connected by a link 12 to the axle 13 or to any other unsprung part of the chassis. An internal arm 14 provided on the inner end of the crank 10 has a cam shaped extremity 15 which registers with the open end of the cylinder 6.

Slidably mounted in the cylinder 6 is a reciprocating piston 16 having a closed outer end 17 in which a diametrical passage 18 and a central recess 19 are formed. The closed end 17 of the piston has an inlet aperture 20 which registers with an internal recess 21 at the head of the piston. The inner periphery of the piston is provided with a recess or seat 22 upon which a washer 23 is held by a spring 24 which bears between the end wall 25 of the housing 1 and the washer 23 so as to normally urge the piston outwardly with respect to the cylinder 6. A cup shaped valve member 27 having an outwardly extending protuberance 28 registering with the outlet aperture 20 is normally urged towards the closed end 17 of the piston by a spring 29 which bears against the forward side of the washer 23. The spring 24 holds the piston 16 against the cam shaped end 15 of the internal arm 14 by which the piston is urged inwardly against a fluid medium such as oil during rebounding of the unsprung part of the vehicle chassis.

Threaded in the opening 7 of the cylinder 6 is a plug 30 which has a passage 31 communicating at one end with the interior of the cylinder 6 and at the other end with the interior of the housing. The plug 30 is provided with a vertical aperture 32 which intersects the passage 31 intermediate its ends and which extends downwardly beyond the passage 31 forming a well 33 which communicates through a passage 34 with the interior of the housing. Slidably mounted in the aperture 32 is a valve stem 35 having a reduced portion 36.

The outer end of the valve stem 35 supports a weight or inertia member 37 which is normally held in an upper position by a spring 38 bearing between the weight 37 and the plug 30. A rubber cushion 39 is mounted on the top of the weight 37 for abutting the inner surface of the cover 5. The spring 38 normally retains the reduced portion 36 of the valve stem 35 in registration with the passage 31 of the plug 30 so as to provide a somewhat restricted outlet path between the interior of the cylinder 6 and the interior of the housing 1 through which the fluid medium may flow through the cylinder during inward movement of the piston 16.

A hardened wearing plate 40 is seated in the recess 19 of the end wall 17 of the piston for receiving the cam shaped end 15 of the internal arm 14. The diametrical groove 18 is formed somewhat deeper than the recess 17 so as to provide inlet apertures adjacent the peripheral portions of the plate 40 which register with the groove 18 through which fluid medium may pass to the inlet aperture 20 during outward movement of the piston 16 relative to the cylinder as viewed in Fig. 1.

Figure 1:
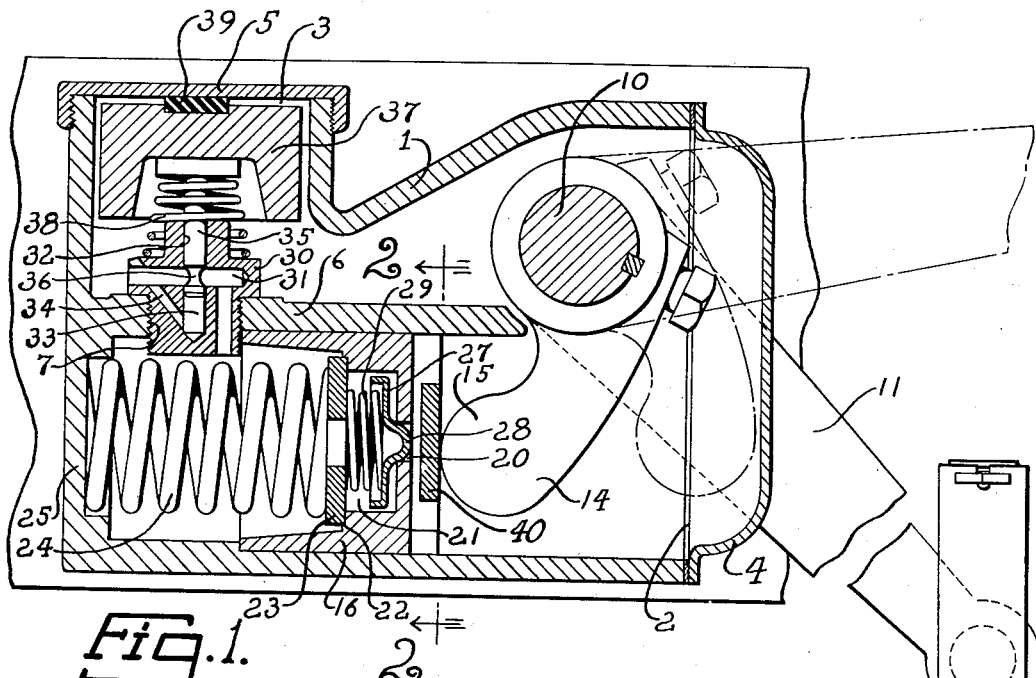
Fig. 1 is a central vertical section embodying my invention.
Figure 2:
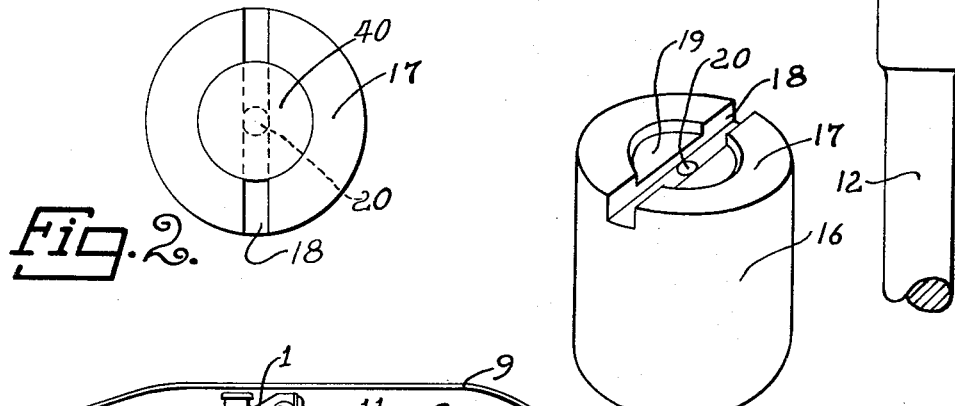
Fig. 2 is a vertical section taken on line 2—2 of Fig. 1.
Figure 3:
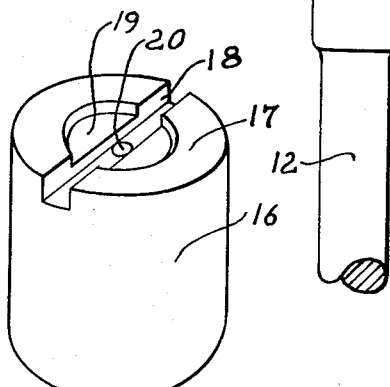
Fig. 3 is a perspective view of a piston employed in my improved shock absorber.

In operation, when the unsprung part of a vehicle chassis provided with the above hydraulic shock absorber is subjected to rebound by the action of the springs upon which it is mounted, the crank arm 11 is rotated in a clockwise direction as viewed in Fig. 1. This action rotates the internal arm 14 of the crank inwardly with respect to the cylinder 6, thereby moving the piston 16 inwardly against the action of the spring 24 and the medium contained in the cylinder. The medium is driven out of the cylinder through the somewhat restricted passage 31 at a predetermined rate thereby slowing down the inward movement of the piston 16 so as to resist the rebounding movement of the unsprung portion of the chassis.

During returning of the unsprung portion of a chassis from its rebounded position, the piston 16 is returned to its outer position, the shock absorber permitting the unsprung part of the chassis to descend under the normal action of the springs upon which it is supported. During the return movement of the piston 16 the cup shaped valve is moved to the left as viewed in Fig. 1, by the action thereon of the fluid medium, admitting the latter to the interior of the cylinder so as to fill the same.

When the unsprung portion of the chassis is subjected to a violent rebounding action, the inertia member or weight 37 lags the upward movement of the housing 1 and plug 30 mounted therein. This action causes the reduced portion 36 of the stem 35 to be urged inwardly and moved out of registration with the passage 31 of the plug, thereby restricting the passage 31 so as to impede the discharge of fuel medium from the interior of the cylinder 6. This action slows up the inward movement of the piston 16 during rebounding of the unsprung portion and causes the rebounding movement to be more rigidly resisted. The lower end of the valve stem 35 is moved into the well 33 against the cushioning action of the fluid medium in the well, the displaced medium being discharged from the well through the passage 34.

With the above construction, the inertia actuated valve mechanism is shiftably mounted in a path substantially normal to the axis of the cylinder and all of the parts of the apparatus are compactly arranged within a housing of dimensions which permit the device to be mounted in the channel of a side member.

Although but one specific embodiment of this invention has herein been shown and described, it will be understood that various changes including the size, shape and arrangement of parts may be made without departing from the spirit of my invention and it is not my intention to limit its scope other than by the terms of the appended claims.

I claim:

1. A shock absorber including a housing adapted to be mounted in the channel of a vehicle chassis side member, a horizontal cylinder in said housing having an outlet opening in its upper side, a fluid medium in said cylinder and housing, a piston in said cylinder, means connected at one end with an unsprung portion of said vehicle and bearing at the other end upon said piston, a removable plug in said outlet opening having a passage communicating with the interior of said housing and cylinder and having a central aperture substantially normal to the axis of said piston communicating with said passage intermediate the ends thereof, a valve member slidably mounted in said aperture for metering the flow of said fluid medium from said cylinder, a weight on the outer end of said valve member, and a spring bearing between said plug and said weight for normally retaining the latter and said valve member in an outwardly extended position, the inertia of said weight being adapted to urge said valve member inwardly during violent upward movement of said vehicle chassis.

2. A shock absorber including a housing adapted to be mounted in the channel of a vehicle chassis side member, a horizontal cylinder in said housing having an outlet opening in its upper side, a fluid medium in said cylinder and housing, a piston in said cylinder, means connected at one end with an unsprung portion of said vehicle and bearing at the other end upon said piston for urging said piston inwardly of said cylinder during upward rebound of the sprung portion of said vehicle chassis, a stationary support mounted on said cylinder, having a bore therein and having a bleed passage connecting the inner end of said bore with the interior of said housing, a valve member slidably mounted in said bore for restricting the flow of fluid medium from the outlet of said cylinder having an inner end portion in close fitting engagement with the walls of the inner end of said bore, and an inertia element on said valve member for bringing said valve member into a metering position during violent upward rebounding of said unsprung chassis portion.

3. A shock absorber including a housing, a cylinder in said housing having an opening therein, a plug in said opening having a passage communicating with the interior of said housing and cylinder end having an aperture intersecting said passage, a valve member including a stem slidably mounted in said aperture and having a portion of reduced diameter, a weight on said stem, a spring bearing between said plug and weight normally holding the reduced portion of said stem in registration with said passage, a well in said plug at the inner end of said stem communicating with the interior of said housing, fluid in said housing and cylinder, and means coacting with said piston for urging the latter inwardly against the action of said fluid.

4. In combination with a vehicle chassis having a channel shaped side member, a housing mounted in the channel of said side member having a cylinder therein, the axis of said cylinder being substantially parallel with the length of said chassis, an upright plug threaded in an aperture in the side wall of said cylinder having a passage therein communicating with the interior of said cylinder and housing, a fluid medium in said housing and cylinder, a piston in said cylinder, means for moving said piston inwardly relative to said cylinder during rebound of said spring portion of said chassis, and an inertia valve member slidably mounted in said plug for restricting said passage during violent rebounding of the sprung portion of the chassis.

5. A shock absorber including a housing adapted to be mounted in the channel of a vehicle chassis side member, a horizontal cylinder in said housing having an outlet opening in its upper side, a fluid medium in said cylinder and housing, a piston in said cylinder, means connected at one end with an unsprung portion of said vehicle and bearing at the other end upon said piston, a stationary support mounted in the outlet of said cylinder having a passage communicating with the interior of said cylinder and a vertical bore intersecting said passage, the lower end of said vertical bore being communicatively connected with the interior of said housing by a branch passage, a valve element slidably mounted in said vertical bore having a reduced intermediate portion registerable with the intersection of said passage and bore for metering the flow of fluid medium therethrough and having a head portion closely fitting the lower end portion of said bore, and an inertia member on said valve element.

NEWTON F. HADLEY.